May 5, 1936.  W. E. CHANCE  2,039,582

MOTOR CAR CONTROL

Filed April 1, 1935  3 Sheets-Sheet 1

Inventor:
Wilbur E. Chance.
By: Milo B. Stevens & Co.
Atty's.

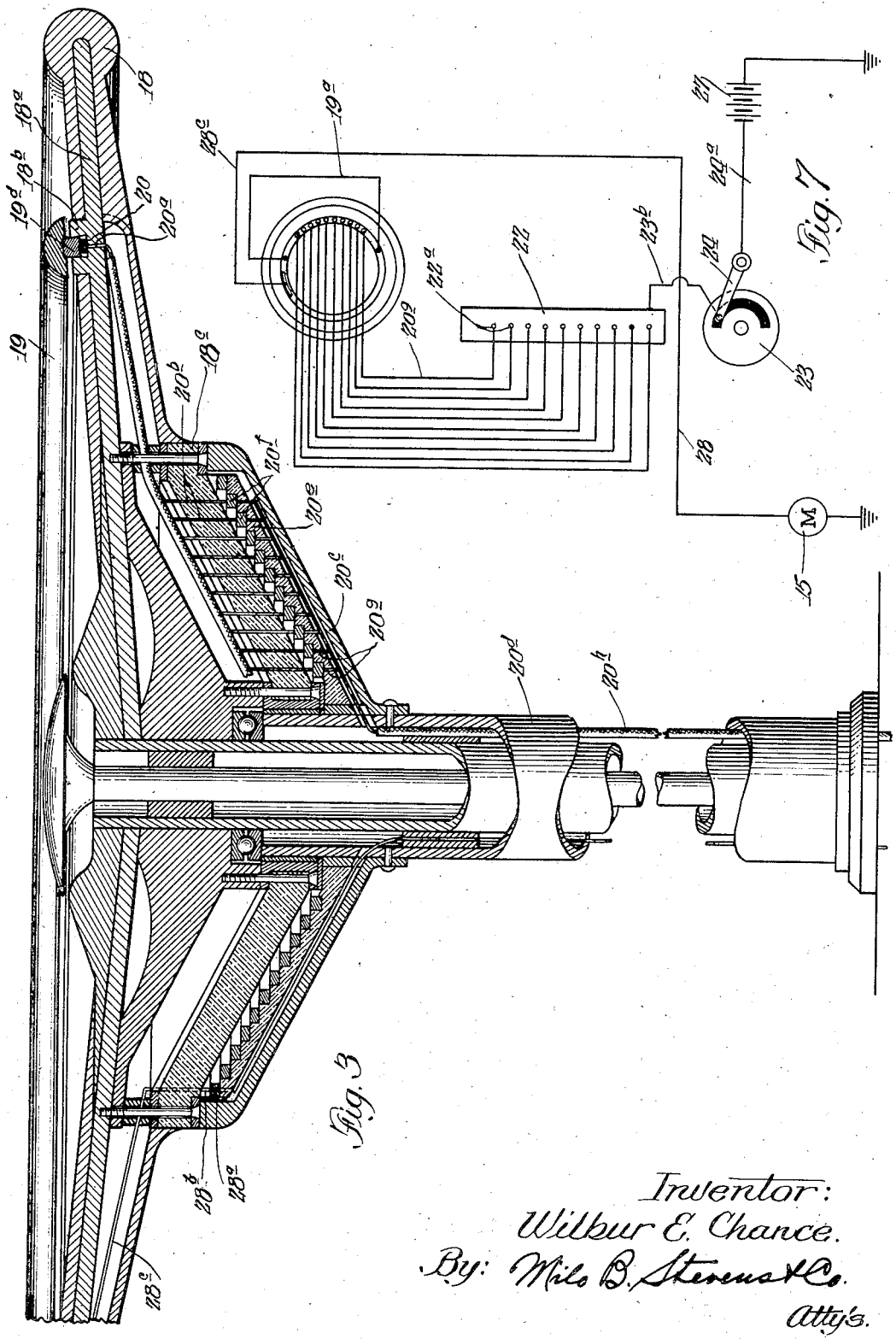

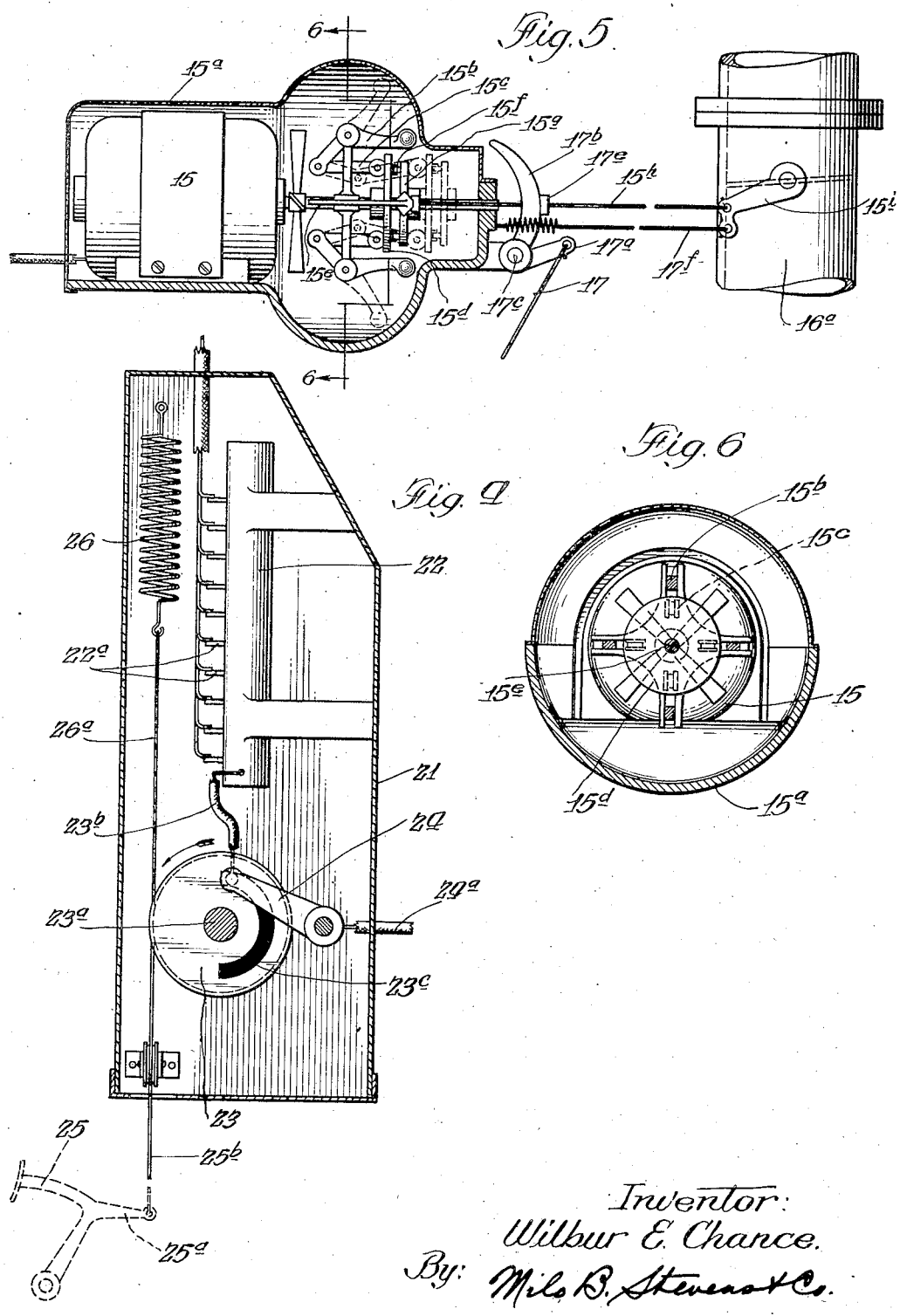

Patented May 5, 1936

2,039,582

UNITED STATES PATENT OFFICE 2,039,582

MOTOR CAR CONTROL

Wilbur E. Chance, Chicago, Ill.

Application April 1, 1935, Serial No. 14,190

8 Claims. (Cl. 192—3)

My invention relates to controls for the operation of motor cars, and more particularly to those dealing with the feed of fuel to the engine, and my main object is to provide a novel control which relieves the driver from the constant use of his foot upon the accelerator pedal during sustained or long distance driving.

A further object of the invention is to provide a handy control on the steering wheel of the motor car whereby to procure any engine speed desired and have the same prevail as long as necessary.

A still further object of the invention is to incorporate a safety feature in the novel control whereby to cut off the fuel from the engine the moment the brake is applied.

Another object of the invention is to employ means for the accessory application of the conventional throttle control along independent lines and for preferred use at any time.

A significant object of the invention is to employ a simple electrical arrangement in the novel control, and which uses a small amount of current from the motor car battery.

An important object of the invention is to design the novel control in the form of three units whose construction on a production basis is relatively inexpensive.

With the above objects in view, and any others which may suggest themselves from the description to follow, a better understanding of the invention may be had by reference to the accompanying drawings, in which—

Fig. 3 is a full enlarged section taken on the line 3—3 of Fig. 2;

Fig. 4 is an interior view of the second unit of the control;

Fig. 5 is a section, partly in elevation, of the third unit;

Fig. 6 is a section on the line 6—6 of Fig. 5; and

Fig. 7 is a diagrammatic view of the electrical circuit employed in the control.

Figure 1:
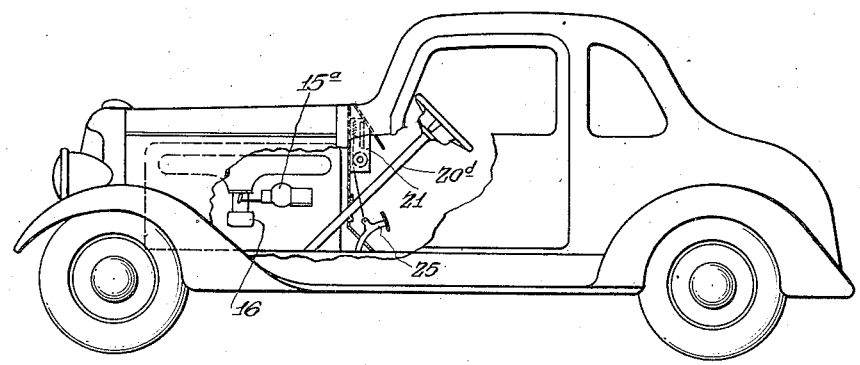
Fig. 1 is an elevation of a typical motor car, partly broken away to expose the novel control.

It is a familiar fact that the driver of a motor car frequently experiences fatigue or soreness from the tension of keeping his foot on the accelerator pedal during sustained or long distance driving, reducing the pleasure or comfort desirable in such driving. While it has been possible in the older models of motor cars to adjust the hand throttle in the center of the steering wheel to permit the removal of the foot from the accelerator pedal, this is not feasible at the present time because few if any cars have the hand throttle control; further in those cars that have such a control, it is in the center of or below the steering wheel, and requires the hand to be removed from the latter. Also, this position of the control makes it difficult to reduce the speed quickly or in an emergency. I have thus designed the novel control to overcome the difficulties mentioned, first, by having a fuel control at the driver's fingertips for regulation to any desired speed, and second, a quick deceleration expedient automatically effective on the customary application of the brake.

In carrying out the invention, the handy fuel control is intended to progressively affect the supply of fuel to the carburetor. In brief, the control is a switch mechanism directed through a rheostat to a small electric motor 15 shown in Fig. 5 and encased in a housing 15a conveniently attached to the motor car engine in proximity to the carburetor 16 thereof. The motor operates a typical centrifugal governor unit 15b whose driven links 15c are pivoted to a slidable crosshead 15d on the motor shaft 15e. The crosshead 15d is attached to impinge through intermediary rollers 15f upon a non-rotatable plate 15g connected by a pushrod 15h to the conventional control 15i located on the throttle tube 16a of the carburetor. Thus, it may be assumed that when the motor is not in rotation the throttle rests in the customary idling position, and that the progressive speed of the motor 15 affects the throttle accordingly.

As has been mentioned, the common accelerator control for the carburetor is retained for use in case the same is preferred, such as for close traffic driving, or in the event that something goes wrong with the electrical control. Thus, the rod 17 from the accelerator pedal is extended to the radial arm 17a of an arcuate cam 17b pivoted at 17c. The cam 17b is located alongside the control rod 15h, and the profile of the cam is immediately behind a block 17e carried by the said rod. It will be apparent that when the accelerator pedal draws on the rod 17, the throttle will be actuated mechanically, a spring 17f serving to draw on the control 15i in order to maintain the engagement of the block 17e with the cam 17b.

Figure 2:
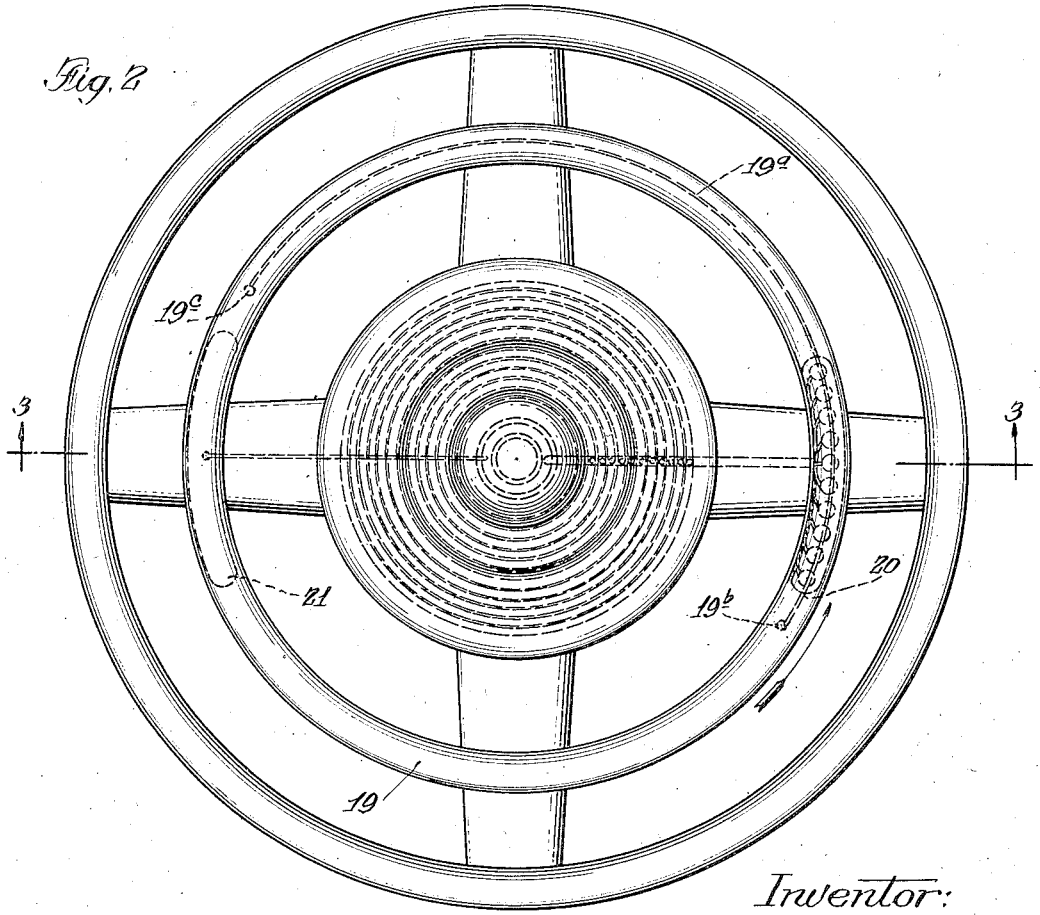
Fig. 2 is an enlarged plan view of the motor car steering wheel in which one unit of the control is housed.

The mechanism for the progressive control of the motor 15 will now be taken up. As shown particularly in Fig. 3, the steering wheel 18 has its spokes 18a built up with an inner circular track 18b over which is freely rotatable a circular band or mounting 19. The latter and the track 18b have a dove-tail sliding connection to keep these parts together while the mounting is moved, although the connection may be made in any other suitable way that will accomplish the same purpose. As indicated in Fig. 2, the mounting 19 has a metallic strip 19a embedded in its lower surface approximately halfway around, the ends of this strip having pins 19b and 19c passing downwardly through the dove-tail rib 19b to a strip 20 seating in the cavity of the track 18b. The parts 19, 19d and 20 are of insulation, and the strip 20 is firmly secured to the steering wheel; also, it contains a row of contact pins 20a which enter from the bottom in insulated coverings, terminating flush with the top of the strip 20. Thus, when the mounting 19 is moved in the direction of the arrow near it in Fig. 2, it is seen that the pin 19b rides over the consecutive contact pins 20a, establishing electrical connections therewith for the purpose of a circuit later to be described. At the same time, the pin 19c rides over a continuous contact plate 21 mounted at the opposite side of the steering wheel, such base also being lodged in the track 18a.

The contact pins 20a are extended downwardly in insulated coverings to issue as radially spaced pins 20b passing downwardly through the insulated steering wheel hub 18c. Below the latter occurs a canopy-like head piece 20c of the steering post 20d, such head piece carrying a conical base 20e of insulation for a series of concentric rings 20f which are preferably in a series of steps for compactness and receive the pins 20b in direct contact from above. Thus, the current in the pins 20a is transmitted to the stationary rings 20f at all positions to which the steering wheel may be turned. The pins 20b are then continued in the form of conductors 20g which are led down through the steering post by way of a suitable composite cable 20h.

The electrical conductors 20g issue from the steering post into a box 21 indicated in Fig. 4 and containing a long bar 22 of resistance material. This bar is formed with a longitudinal series of connectors 22a to which the respective conductors 20g are individually secured. The box 21 also carries a rotary switch 23 mounted on a shaft 23a. The metallic portion of this switch is connected by means of a wire 23b to one end of the resistance bar 22, and also has bearing on it an arm 24 leading to a conductor 24a. When the parts are in these positions, a direct electrical connection is established between the conductors 23b and 24a. However, when the switch 23 is rotated in the direction of the arrow shown in Fig. 4, the arm 24 rides on an insulated portion 23c of the switch which severs the connection referred to. The operation of the switch is procured from the motor car brake pedal 25 by way of an arm 25a extended from the pedal and receiving a cable 25b. The cable is wrapped around the rim of the switch 23 and secured thereat so as to rotate the switch when the brake pedal is depressed. Although the brake pedal itself is commonly retracted by a spring in the brake gear, I have provided a special spring 26 drawing upon the switch 23 through a rod 26a in a direction opposite from the one under consideration, so that the return of the switch to original position is assured the moment the switch pedal is released.

As indicated in the diagrammatic view of Fig. 7, the conductor 24a extends to one terminal of the motor car battery 27, the other terminal of the latter being grounded, as usual. One terminal of the motor 15 is also grounded, but the other terminal extends by way of a conductor 28 into the steering post, being led up in the same manner as the other conductors 20g to terminate in a stationary ring 28a. Above the latter the conductor is continued as a contact pin 28b carried by the rotatable part of the steering wheel and extending as a conductor 28c to connect with the plate 21.

It is now seen how the mounting 19 acts as a rheostat control for the motor 15. Thus, with the mounting in the normal position shown, the pins 19 of the mounting strip 19a are free from the contact pins 20a. However, should the mounting be turned so that the pin 19b makes contact with the first pin 20a, it will be seen that a circuit is established from the said pin to the conductor marked 20g in Fig. 7, then through the resistance bar 22, the conductor 23b, the switch 23, the arm 24, the conductor 24a, the battery 27, the ground, the motor 15, the conductor 28, the conductor 28c, the plate 21, the pin 19c, the strip 19a and the pin 19b. Since the connection of the conductor 20g with the resistance strip 22 is at one end of the latter while the conductor 23b extends from the other end thereof, only a small amount of current will enter the motor, causing it to turn slowly and open the throttle only slightly. It follows that as the steering wheel mounting 19 is given a further movement an increase of the motor speed will ensue, affecting the throttle accordingly.

Thus, the engine speed is controlled and regulated as desired while both hands of the driver are on the steering wheel, and the mounting is moved with the thumb of the hand in one or the other direction according to the speed desired. However, should a sudden development or emergency require a reduction of engine speed quicker than the driver can obtain by the manipulation of the mounting 19, the current to the motor will be entirely cut off by the automatic cut-off of the switch 23 as the driver presses the brake pedal as usual. The device is therefore automatic from the standpoint of safety, yet flexible in its control by the light movement of the thumb while both hands of the driver rest on the steering wheel, so that attention to the foot accelerator is unnecessary and the fatigue and strain caused by continual engagement of the foot therewith are eliminated. Yet, should the electrical system fail in any way, both the accelerator and the brake are immediately available to the driver for use in the original manner.

I claim:

1. A throttle control for motor cars comprising a support on the steering wheel, a rotatable member over the support, co-acting electrical contact means between the member and the support, an electrical circuit, a resistance in the latter variably controlled by the progressive motion of the rotatable member, a motive unit in the circuit and having a speed controlled by the value of the resistance, and means actuated by the motive unit to control the throttle according to the speed of the motive unit.

2. The structure of claim 1, said support comprising a circular track and said rotatable member being a mounting of ring form.

3. The structure of claim 1, the said motive unit being an electric motor in the circuit, and the means actuated by the motive unit being a centrifugal governor, a throttle lever, and a connection between the driven element of the governor and the throttle lever.

4. The structure of claim 1, and an element connected to the motor car accelerator and independently effective upon the means actuated by said motive unit.

5. The structure of claim 1, and an element connected to the motor car accelerator and independently effective upon the means acuated by said motive unit, said element comprising an abutment on the means controlled by said motive unit, and a cam leading from the accelerator and progressively effective upon the abutment to procure the throttle action.

6. The structure of claim 1, an element movable to interrupt the circuit and a connection from the motor car brake pedal to render the element effective upon the advance of such pedal.

7. A control comprising an electric motor, a circuit for the same, a resistance to procure variable speeds for the motor, a set of leads to the points along the resistance, a steering post, a set of concentric rings rigidly mounted in the latter and receiving said leads, a steering wheel with a hub over the set of rings, radially spaced pins carried by the steering wheel and contacting with the respective rings, a return lead from the circuit into the zone of the rings, a single ring receiving said return lead, a pin carried by the steering wheel and in contact with the single ring, and a switch carried by the single ring and adapted to make connection between said return lead and any one of the said radially spaced pins.

8. A motor car throttle control comprising in combination, a steering wheel, an electrical circuit including a motor and a variable resistance therefor, selective control means on the steering wheel for said variable resistance, and a throttle valve control operably responsive to the speed of said motor.

WILBUR E. CHANCE.